Jan. 25, 1966 K. E. COULTER ETAL 3,230,722
MACHINE AND METHOD OF INSTALLING PLASTIC PIPE
Filed Jan. 21, 1963 2 Sheets-Sheet 1
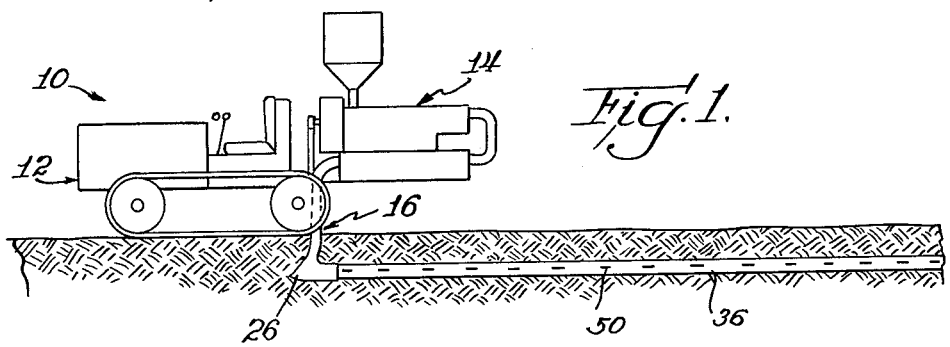
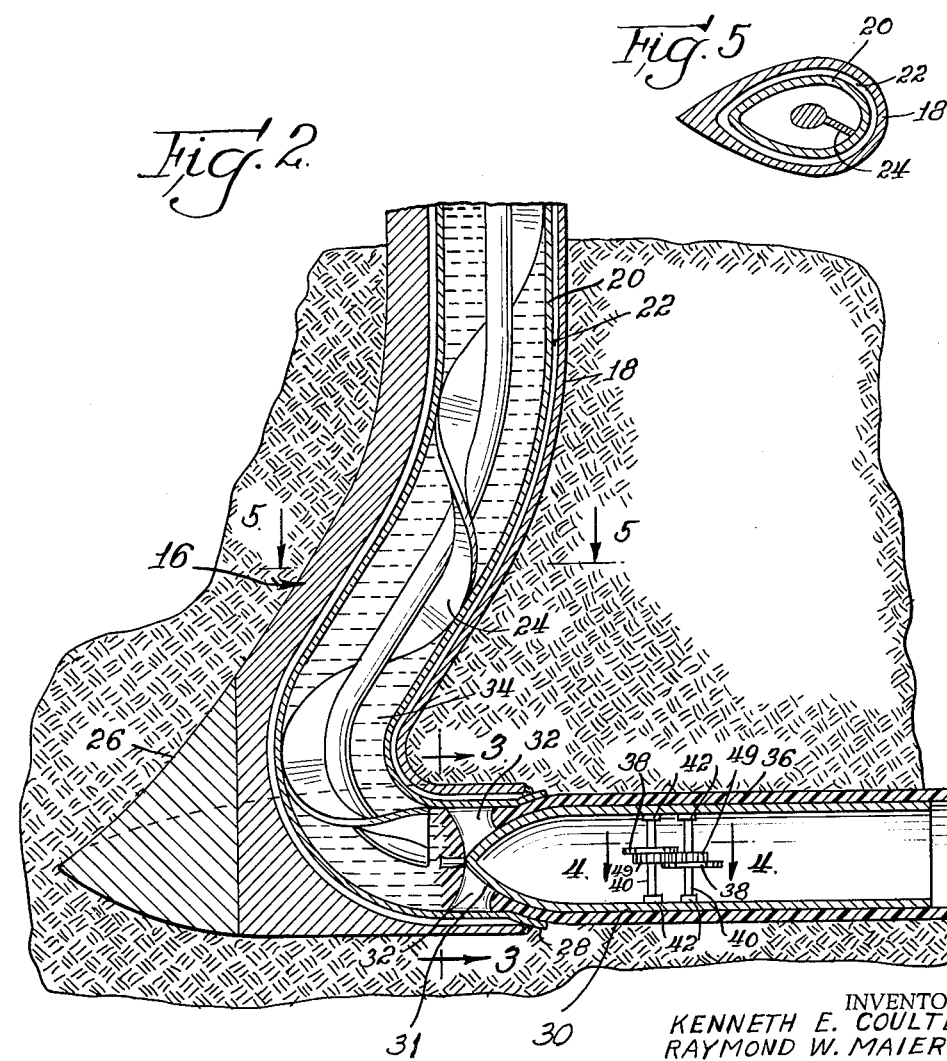
INVENTORS
KENNETH E. COULTER &
RAYMOND W. MAIER
BY
ATTY'S.

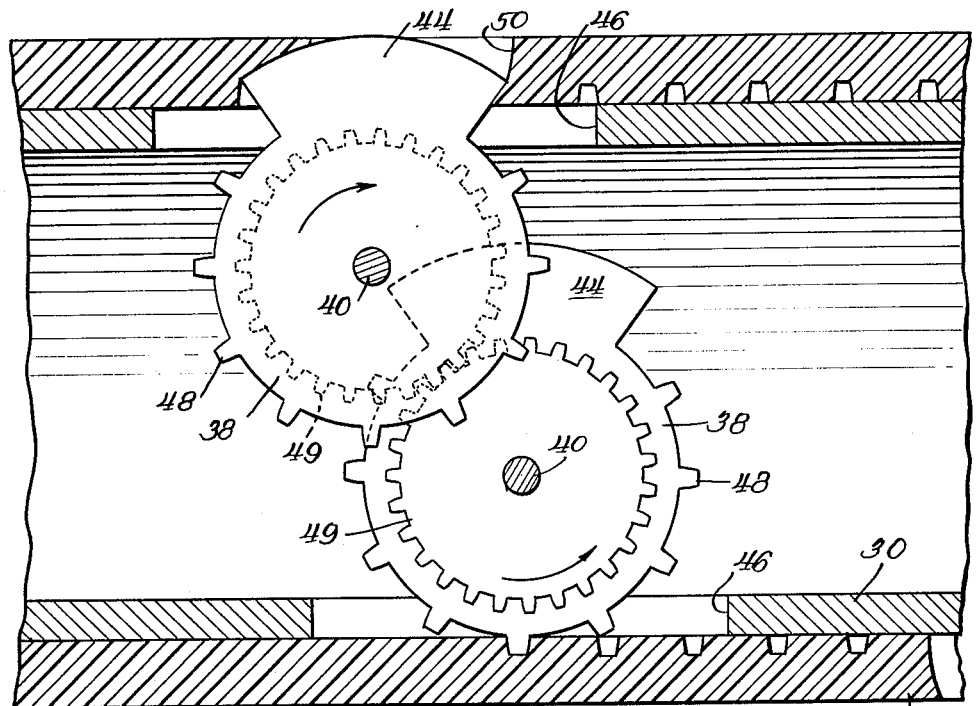
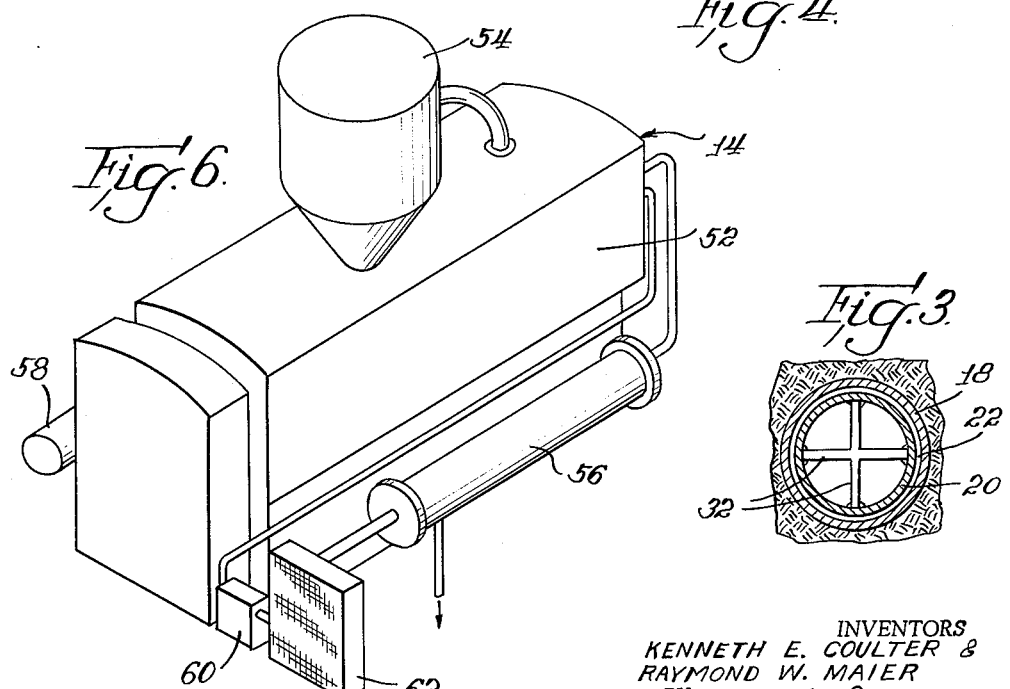

United States Patent Office 3,230,722
Patented Jan. 25, 1966

1

3,230,722
MACHINE AND METHOD OF INSTALLING
PLASTIC PIPE
Kenneth E. Coulter and Raymond W. Maier, Midland,
Mich., assignors to The Dow Chemical Company, Midland, Mich., a corporation of Delaware
Filed Jan. 21, 1963, Ser. No. 252,896
4 Claims. (Cl. 61—72.2)

This invention relates to a machine and method for installing plastic pipe underground in an integrated operation, to form a continuous length pipe.

Briefly, the method of the invention includes the steps of forming a trough-like hole in the ground with a plow assemblage attached to a tractor, extruding, from the rear end of the plow assemblage, a quick setting plastic foam in the form of a pipe, into the hole as the plow assemblage is moved along, and automatically backfilling the hole by action of the unsupported ground which was momentarily displaced by the plow assemblage. A series of slots are formed in the pipe, to serve as drainage ports for water in-take, when the pipe is to be used for drainage purposes. However, formation of such ports may be eliminated when the pipe is to be used for liquid carrying purposes, or when used as a sheathing for underground power lines, or piping. The machine used to perform the method of the invention, is self-contained, insofar as it is adapted to carry and mix as required, the ingredients used to form the plastic pipe.

The machine and method of the invention, afford great economies in the art of laying underground pipe, not only in cost of material, but in labor cost. Such economies are attractive, especially when large installations are involved.

A primary objective of the invention is to provide an improvement in the art of installing underground piping.

A more specific object is to provide a machine and method for laying a continuous length plastic pipe underground in an efficient manner, which affords great economies.

Still another object is to provide a machine and method for laying a continuous length plastic pipe underground, which pipe may be arranged to carry run-off ground water, or used for conveying liquids, or as a sheathing for power lines, etc.

A further object is to provide a machine and method for installing underground pipe in an integrated operation, including formation of a trench, extruding a quick-setting plastic foam in the bottom of the trench, and back-filling the trench.

These and further objects and features of the invention will become more apparent from the following description and accompanying drawings wherein:

FIG. 1 is a schematic view illustrating apparatus embodying the principles of the invention and showing the same in operative condition;

FIG. 2 is an enlarged sectional view through a plastic pipe forming and laying plow assemblage as used in the apparatus illustrated in FIG. 1;

FIG. 3 is a section view generally as seen along line 3—3 in FIG. 2;

FIG. 4 is an enlarged section view generally as seen in a plane indicated by the arrows 4—4 in FIG. 2;

FIG. 5 is a section view generally as seen along line 5—5 in FIG. 2; and

FIG. 6 is a perspective-like view of an extruder unit as used in the apparatus of FIG. 1.

Referring now to the drawings, numeral 10 identifies apparatus embodying the principles of the invention which includes a caterpillar tractor 12, or equivalent motorized prime mover, an extruder unit 14 mounted on

2 the rear end of the tractor, and a plastic pipe forming and laying plow assemblage 16. Plow positioning means (not shown), are provided to lower and raise the plow assemblage 16, so that a continuous pipe forming operation may be performed in the ground at depths of from 30 inches to 54 inches. Such plow positioning means may be arranged to provide a desired slope to the laid pipe when the latter is used for drainage purposes.

The plow assemblage 16 comprises an elongated outer casing 18 in spaced relation to an elongated inner casing 20 to form a tubular passageway 22 through which a liquid may be circulated for temperature regulation of the plastic material flowing within the casing 20 during a pipe forming operation. A curved vane 24 is disposed in the inner casing 20 for agitation of the plastic flowing in the casing. At the lower end of the outer casing 18, is a pointed tip 26 which serves to plow or otherwise form a circular passageway in the ground as the plow assemblage 16 is moved therethrough. It will be noted that the shape of the casings 18 and 20 in the region above the tip 26, is somewhat tear-shape with the lead end of sharper configuration, as best seen in FIG. 5, so that the resistance to the plow assemblage 16 will be minimized as it is moved through the ground. Accordingly, the exterior shape of the tip 26 and the lower region of the casings 18 and 20, will undergo a transition to accommodate change of shape from a tear-drop to a circular passageway.

As shown in FIG. 2, the casings 18 and 20 are curved rearwardly so that plastic material will be discharged at the lower extremity in a horizontal direction. At the discharge end, the inner casing 20 is arranged to extend beyond the outer casing 18, and to flare outwardly to form a shaping lip 28. Affixed to the end of the inner casing 20, is a torpedo, or tubular forming mandrel 30, the axis of which extends in a horizontal direction; the axis of the forming mandrel may preferably coincide with the point of the tip 26. While a round forming mandrel with a pointed tip 31 is indicated, shapes other than round may be utilized. A plurality of gussets, or vanes 32, four in number being shown by way of example, are provided for anchoring the forming mandrel 30 to the inner casing 20. The vanes 32, which may be of streamlined configuration, are of a minimum length (consistent with strength requirements) in the horizontal direction so that plastic material flow therepast will not be channeled to the extent that it will fail to recombine after passing the vanes. The shaping lip 28 is positioned a uniform distance about the forming mandrel 30 so that plastic material 34 being extruded, or ejected, from the inner casing 20, will form a continuous pipe 36 as the plastic material quickly sets up.

Mounted in the forming mandrel 30, is a pipe slotting means including a pair of wheel assemblies 38, each being mounted on a rotatable shaft 40 the ends of which are journalled in bearing means 42 supported upon the inner wall of the forming mandrel 30. Each wheel assembly 38 is formed to provide an arcuate segment 44 which projects through a slot 46 provided in the wall of the forming mandrel a distance at least equal to the thickness of the plastic pipe 36, as well as a plurality of teeth 48 spaced about the periphery, which project through the slot 46 and engage the plastic pipe 36, as best seen in FIG. 4. A gear 49 is provided on each wheel assembly, which gears mesh to synchronize the rotary movement of the wheel assemblies. As the forming mandrel 30 is pulled through the ground in the trough formed by the plow assemblage 16, the engagement of the teeth 48 of each wheel assembly with the pipe 36, will cause rotation of the wheel assemblies so that a series of horizontal slots 50 will be formed on opposite sides of the pipe at the mid-elevation thereof, by action of the segments 44. These slots allow for seepage of ground water into the pipe 36, for drainage purposes. Pipe having such slots 50 may be used for underground watering purposes, if desired.

Obviously, a forming mandrel 30 may be made without a pipe slotting means, if slots are not desired in the pipe being laid, so that such pipe may be used for underground conduction of water, or other liquids, or as a protective sheath for power lines. Pipe with slots 50, may find useage as an underground watering, or saturating means when pressurized water is admitted thereto.

The extruder unit 14 is powered by a shaft extension from the engine of the tractor 12, and includes an extruder 52, a storage hopper 54, a jacketed cooler 56, a generator 58, a water pump 60, and a radiator 62, all as seen in FIG. 6. Means (not shown) are arranged to coordinate the rate of polymer flow to the plow assemblage 16 and the speed of the tractor 12, so that a pipe 36 of desired proportions will be formed. Such means assure that no plastic will be extruded from the plow assemblage 16 when the tractor 12 is not in motion, and further that the plastic material in the plow assemblage will be kept at a temperature, or otherwise maintained in a condition which will avoid premature set-up during temporary flow stoppage.

The operation of the apparatus 10, which should be fairly obvious, is as follows: the plow assemblage 16 is lowered into the ground to form a trough the lower portion of which is at a desired depth, as the tractor 12 is driven forward. At the desired depth of the trough the extruder unit 14 is operated so that a predetermined quantity of plastic foam is extruded by the plow assemblage to form the pipe 36. As the pipe is formed, and perforated by the segments 44, the ground which has been plowed, or pushed aside by the plow assemblage during forward movement thereof, will re-fill the trough above the extruded pipe. It will be understood, of course, that any underground obstructions, such as large rocks, etc., will present a hazard toward successful operation, as in the case of any plowing operation. However, it will be well within the skill of those competent in the art, to design the plow assemblage 16, so that it is adequate for ordinary and expected plowing conditions. Toward this end, the pointed tip 26 may be arranged for easy installation and removal, as required for normal wear and breakage.

While various types of foamed plastics, or equivalents, may be used with good effect in the practice of the method of the invention, a pressurized gel of polystyrene and methyl chloride will give satisfactory results for most purposes. Under certain conditions, a non-expandable plastic, such as polyethylene, or polypropylene, may be used.

It will be seen that the method and machine above described will satisfy all of the objectives as set forth hereinbefore.

The foregoing description has been given in detail without thought of limitation since the inventive principles involved are capable of assuming other forms without departing from the spirit of the invention or the scope of the following claims.

What is claimed is:

1. A method of forming and laying continuous length thermoplastic pipe underground in a manner wherein positive back fill over said pipe occurs through free flow of the earth comprising the steps of continuously displacing earth to form a circular passageway underground at a desired distance from the ground surface, heating thermoplastic to a liquid condition above said ground surface and then feeding said liquid thermoplastic to said passageway, simultaneously stirring and applying heat to said liquid thermoplastic along the path of flow of said thermoplastic from said surface to said passageway and then extruding said thermoplastic in tubular form through an annular extrusion slit facing said underground passageway directly into said passageway as said earth is continuously displaced, and maintaining said tubular form as said thermoplastic hardens and said earth back fills.

2. The method of claim 1 wherein the maintaining of said tubular form is accompanied with the forming of a plurality of horizontally arranged slotted openings in said tubular form of said thermoplastic.

3. Apparatus for forming and laying continuous length thermoplastic pipe underground in a manner wherein positive back fill over said pipe occurs through free flow of the earth comprising, in combination, a power driven vehicle with a thermoplastic extruder unit thereon for heating said thermoplastic to a liquid condition and feeding it, a thermoplastic pipe forming and laying plow assemblage which communicates with said extruder unit to receive the liquid thermoplastic, means to raise and lower said assemblage into the ground for forming a circular passageway underground at a desired distance from the ground surface, said plow assemblage having an outer hollow tubular structure for circulation of liquid for temperature regulation of the thermoplastic material flowing through said plow assemblage, means to agitate said flowing thermoplastic material, and a pipe forming extrusion slit at the lower extremity thereof, facing said circular passageway, and mandrel means to maintain said thermoplastic pipe in tubular form as it is extruded whereby a thermoplastic pipe may be continuously extruded directly into said passageway as said vehicle is drawn over said ground.

4. The apparatus of claim 3 wherein said means to agitate comprises a curved vane within the inner cavity of said outer hollow tubular structure and extending over its length and said mandrel means having a perforating means comprising a pair of rotatable elements, each of which has an arcuate segment arranged to project through a slot in said mandrel means to perforate said thermoplastic pipe as it is extruded.

References Cited by the Examiner

UNITED STATES PATENTS

| | | | |
|---|---|---|---|
| 166,104 | 7/1875 | Hoffhein | 61—72.6 X |
| 330,724 | 11/1885 | Montgomery | 61—72.2 |
| 1,006,116 | 10/1911 | Morse | 61—72.2 |
| 1,303,399 | 5/1919 | Ryan | 61—72.2 |
| 1,340,836 | 5/1920 | Powell | 61—72.2 |
| 2,718,684 | 9/1955 | Bjorksten | 61—72.6 |
| 2,763,991 | 9/1956 | Kennon | 61—72.6 |

FOREIGN PATENTS

| | | |
|---|---|---|
| 283,035 | 1/1928 | Great Britain. |
| 570,970 | 7/1945 | Great Britain. |

OTHER REFERENCES

Agricultural Engineering, vol. 39, No. 11, November 1958, page 712.

CHARLES E. O'CONNELL, *Primary Examiner.*

EARL J. WITMER, *Examiner.*